(12) United States Patent
Gyugyi

(10) Patent No.: US 7,934,255 B1
(45) Date of Patent: *Apr. 26, 2011

(54) APPARATUS, SYSTEM, AND METHOD FOR OFFLOADING PACKET CLASSIFICATION

(75) Inventor: Paul J. Gyugyi, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 965 days.

This patent is subject to a terminal disclaimer.

(21) Appl. No.: 11/609,293

(22) Filed: Dec. 11, 2006

Related U.S. Application Data

(63) Continuation-in-part of application No. 11/270,146, filed on Nov. 8, 2005.

(51) Int. Cl.
G06F 11/00 (2006.01)
G08B 23/00 (2006.01)

(52) U.S. Cl. .......................... 726/22; 713/187; 713/188

(58) Field of Classification Search .................. 713/187, 713/188; 726/22, 23, 24, 25
See application file for complete search history.

(56) References Cited

U.S. PATENT DOCUMENTS

| | | | | |
|---|---|---|---|---|
| 5,864,780 | A * | 1/1999 | Kossentini et al. | 702/181 |
| 5,890,102 | A * | 3/1999 | Kossentini et al. | 702/181 |
| 6,597,363 | B1 * | 7/2003 | Duluk et al. | 345/506 |
| 6,629,099 | B2 * | 9/2003 | Cheng | 707/707 |
| 7,184,546 | B2 * | 2/2007 | Garcia | 380/28 |
| 7,468,979 | B2 * | 12/2008 | Ricciulli | 370/392 |
| 7,508,985 | B2 * | 3/2009 | Van Lunteren | 382/181 |
| 2002/0073073 | A1 * | 6/2002 | Cheng | 707/2 |
| 2002/0136408 | A1 * | 9/2002 | Garcia | 380/259 |
| 2004/0174820 | A1 * | 9/2004 | Ricciulli | 370/245 |
| 2004/0202190 | A1 * | 10/2004 | Ricciulli | 370/410 |
| 2005/0012521 | A1 * | 1/2005 | Sharangpani et al. | 326/46 |
| 2005/0021360 | A1 * | 1/2005 | Miller et al. | 705/1 |
| 2005/0028114 | A1 * | 2/2005 | Gould et al. | 716/3 |
| 2005/0035784 | A1 * | 2/2005 | Gould et al. | 326/46 |
| 2005/0132342 | A1 * | 6/2005 | Van Lunteren | 717/143 |
| 2005/0240999 | A1 * | 10/2005 | Rubin et al. | 726/22 |
| 2005/0246682 | A1 * | 11/2005 | Hines | 717/109 |
| 2005/0251509 | A1 * | 11/2005 | Pontius | 707/3 |
| 2005/0273858 | A1 * | 12/2005 | Zadok et al. | 726/24 |
| 2005/0278781 | A1 * | 12/2005 | Zhao et al. | 726/22 |
| 2005/0278783 | A1 * | 12/2005 | Chien et al. | 726/22 |
| 2006/0005241 | A1 * | 1/2006 | Zhao et al. | 726/22 |
| 2006/0020595 | A1 * | 1/2006 | Norton et al. | 707/6 |
| 2006/0077979 | A1 * | 4/2006 | Dubrovsky et al. | 370/394 |
| 2006/0085389 | A1 * | 4/2006 | Flanagan et al. | 707/2 |
| 2006/0101195 | A1 * | 5/2006 | Jain | 711/104 |
| 2006/0120137 | A1 * | 6/2006 | Gould et al. | 365/149 |
| 2006/0167915 | A1 * | 7/2006 | Furlong et al. | 707/101 |
| 2006/0174107 | A1 * | 8/2006 | Furlong et al. | 713/160 |
| 2006/0203816 | A1 * | 9/2006 | O'Malley et al. | 370/389 |
| 2006/0242710 | A1 * | 10/2006 | Alexander | 726/24 |

(Continued)

OTHER PUBLICATIONS

Nvidia Corporation. Technical Brief Nvidia GeForce 8800 GPU Architecture Overview (Nov. 2006).

(Continued)

*Primary Examiner* — David Garcia Cervetti
(74) *Attorney, Agent, or Firm* — Cooley LLP

(57) ABSTRACT

A computing system offloads packet classification from a central processing unit to a graphics processing unit. In one implementation input data packets to be classified are represented as a first texture, classification rules are represented as a second texture, and a shading operation is performed to classify packets.

15 Claims, 7 Drawing Sheets

U.S. PATENT DOCUMENTS

2007/0043964 A1* 2/2007 Lim et al. .................. 713/322
2008/0209560 A1* 8/2008 Dapp ........................... 726/23
2008/0263039 A1* 10/2008 Van Lunteren .............. 707/6

OTHER PUBLICATIONS

Nvidia Corporation. Technical Brief Microsoft DirectX 10: The Next Generation Graphics API (Nov. 2006).

* cited by examiner

APPARATUS, SYSTEM, AND METHOD FOR OFFLOADING PACKET CLASSIFICATION

CROSS REFERENCE TO RELATED APPLICATIONS

This application is a continuation-in-part of U.S. patent Ser. No. 11/270,146, "Apparatus, System, and Method For Offloading Pattern Matching Scanning," filed on Nov. 8, 2005, the contents of which are hereby incorporated by reference.

FIELD OF THE INVENTION

The present invention is generally directed towards performing packet classification. More particularly, the present invention is directed towards offloading packet classification from a central processing unit to a graphics processing unit.

BACKGROUND OF THE INVENTION

Computer systems typically include diagnostic software that scans data files or received data packets to detect pattern matches indicative of problems such as computer viruses or intrusive attacks. For example, computer anti-virus software typically scans files for patterns indicative of computer viruses. Depending upon the implementation, diagnostic software may also scan data packets received from a network. For example, some types of computer intrusion software detects patterns in data packets indicative that a source of incoming data or requests is untrustworthy. As one example, intrusion detection software may look for patterns in password prompts and other information indicative of an intruder.

Conventional pattern matching software performs sequential pattern matching in which a data source is compared to different patterns in a sequence i.e., first pattern 1 is checked against the data source, then pattern 2, then pattern 3, and so on until all of the different patterns are checked. A problem with pattern matching software is that it places a substantial burden on the resources of a central processing unit (CPU). This is due in part, to the large number of patterns that must be compared in typical applications. For example, anti-virus software typically must guard against numerous different types of viruses that each require different pattern matches to be performed. As a result, many computer systems run significantly slower when anti-virus software is running in the background. Moreover, a complete anti-virus scan often takes longer than desired in many computer systems. For example, in some personal computer systems it can take several hours to perform a complete anti-virus scan of all files stored on a disk.

The demands for diagnostic pattern matching scans continues to increase. For example, anti-virus software companies regularly increase the dictionary of patterns that must be scanned in order to address new viruses or other problems, such as spyware. Additionally, diagnostic software is increasingly being applied to address new issues, such as implementing increasingly sophisticated intrusion detection algorithms. It can therefore be expected that pattern matching scanning will impose an ever increasing burden on computing resources.

Additionally, many computer systems also require data packets to be classified using software running on the CPU. Network packet classification involves the search of regions of data (such as packets from a network interface) for instances of known patterns in the data and thus also requires a form of pattern matching. There has been much research in academia and industry into efficient search algorithms; however the search operation remains both CPU and memory intensive. Packet classification can, for example, include examining the headers of data packets to classify packets based upon header fields. More generally, however, packet classification can also include a classification of data packets based upon an examination of the payload of the data packet. As computing systems evolve, there is an increasing need to classify data packets.

Therefore, in light of the problems described above the apparatus, system, and method of the present invention was developed.

SUMMARY OF THE INVENTION

A computing system has a central processing unit (CPU) and a graphics processing unit (GPU). The GPU is configured to have a mode of operation in which the GPU classifies data packets on the behalf of the computing system. In one implementation, packet classification is performed by formatting input data from data packets into pixels and performing a shading operation in the graphics processing unit to implement packet classification. In one embodiment, input data from data packets are padded to regular boundaries and the shading operation is a dependent texture operation to implement a finite state machine implementation of a pattern matching algorithm.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
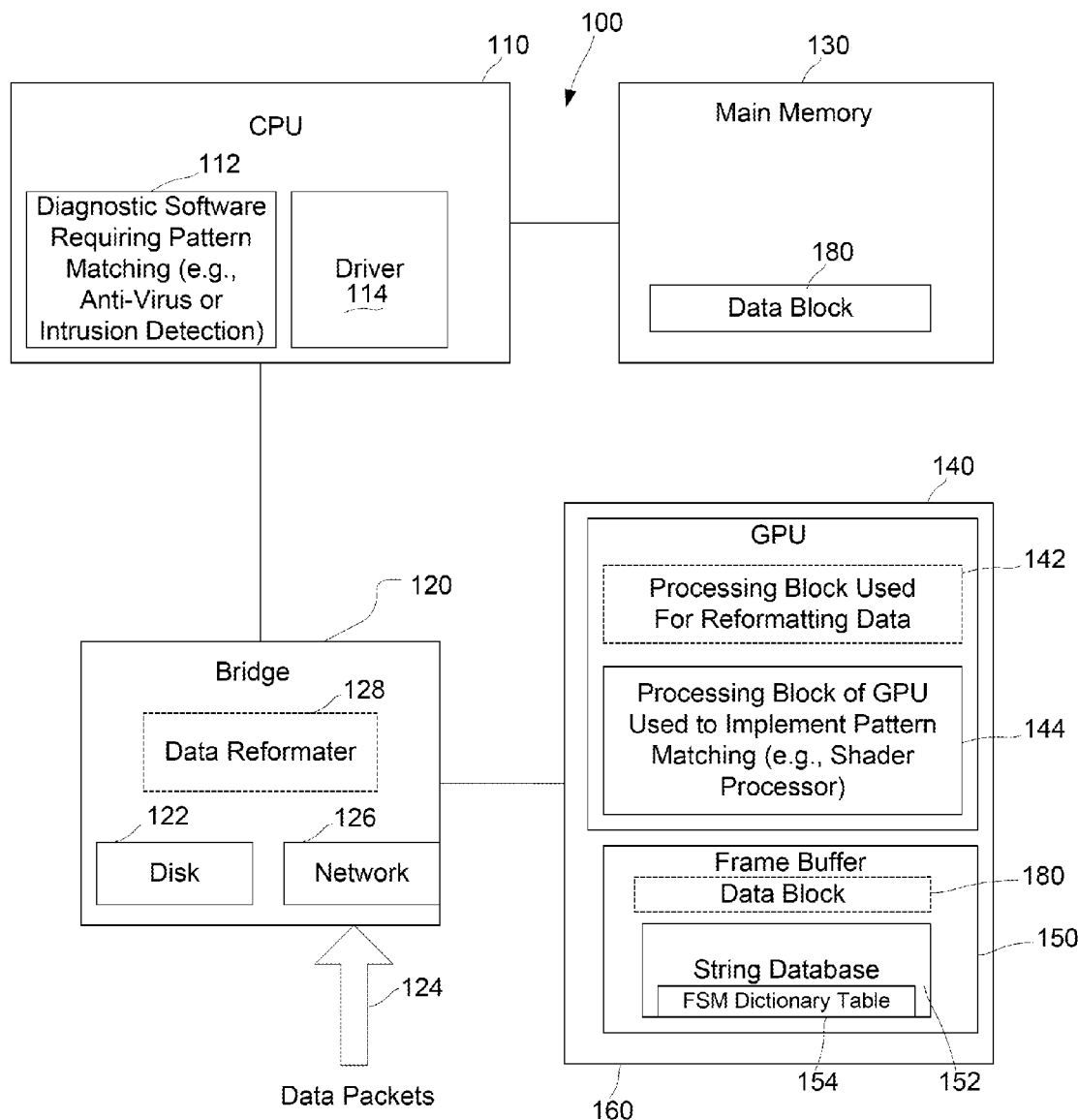
FIG. 1 is a block diagram of a computing system that offloads pattern matching scanning to a graphics processing unit in accordance with one embodiment of the present invention.

FIG. 1 illustrates a computing system 100 in accordance with one embodiment of the present invention. Computing system 100 is configured to support graphics processing and may including a variety of types of computing systems that support graphics processing, such as personal computers, networked computers, media center computers, and laptop computers.

A central processing unit 110 is provided for executing software applications. As an illustrative example, in a personal computer CPU 110 may be the CPU that executes software applications running on the personal computer. A bridge module 120 may be included to couple data between different devices in computing system 100. Bridge module 120 may, for example, implement the function of a North bridge. A main memory 130 is provided to store data and may, for example, be coupled either directly to CPU 110 or via bridge module 120 or other intermediate element.

Graphics processing unit (GPU) 140 performs graphics processing operations on the behalf of CPU 110. In one embodiment a frame buffer memory 150 is provided for GPU 140 to store graphics data. In one embodiment GPU 140 and frame buffer 150 are disposed on a graphics card 160. However, it will also be understood in the following discussion that other implementations of GPU 140 are contemplated. For example, GPU 140 may be implemented as an integrated GPU residing inside a chipset with the frame buffer located in system memory.

CPU 110 has diagnostic software 112 that it executes which requires pattern matching scans. The pattern matching scans may, for example, include scans to detect strings of characters indicative of a problem. In many typical diagnostic applications a dictionary will include many different strings of characters for which a pattern matching scan must be performed to complete a particular diagnostic function. Illustrative examples of diagnostic software requiring pattern matching scans include computer virus detection software (often known as "anti-virus" software) and intrusion detection software. The diagnostic software 112 may require a pattern matching scan to be performed on a scheduled basis. Alternatively, diagnostics software 112 may diagnose problems as computing system 100 receives a stream of data from a network, such as performing virus scans as a computer user downloads data from the Internet.

CPU 110 also executes a graphics driver 114 for interacting with GPU 140. CPU 110 may also execute other software applications, such as graphics applications (not shown), text applications, media applications, and email applications. It will be understood that software modules for each application reside on a memory associated with CPU 110 and may be provided to end-users pre-loaded on computing system 100, downloadable from the Internet, or as software modules having computer readable program code stored on a computer-readable medium.

One aspect of the present invention is that at least some pattern matching scanning calculations are offloaded from CPU 110 to GPU 140. GPUs have evolved to support demanding graphics applications, such as three dimensional games and simulations. Consequently, GPU 140 will typically have substantial processing power for performing calculations upon graphics data within the graphics domain. Moreover, in a multi-purpose computing system, GPU 140 is typically fully utilized only for the fraction of the time that an end-user operates a demanding graphics application. Thus, GPU 140 is a potential resource for performing pattern matching scanning. Consequently, in accordance with the present invention diagnostic software 112 has a mode of operation in which it offloads pattern matching scanning calculations to GPU 140.

Pattern matching scanning may be performed on data blocks 180 of a pre-selected size. An exemplary size is 64K, corresponding to a conventional network data window size. An individual data block 180 may reside in any memory of computing system 100 accessible by GPU 140 directly or through a direct memory access, such as main memory 130 or frame buffer 150. The source of data for a data block may be stored data, such as data accessed from a disk (not shown) via a disk interface 122.

In one embodiment the source of data for a data block 180 comes from data packets 124 received by a network interface 126. For the case of data packets received from a data network, payload data for a number of data packets may be aggregated into a data block 180 for efficient analysis. Attributes of the header information may also be collected for analysis. In one embodiment, a data block 180 formed from incoming data packets may be intercepted for pattern matching in GPU 140 before it is processed by CPU 110. For example, bridge module 120 may be configured in response to an offload command to route data packets to GPU 140 for pattern matching analysis.

In one embodiment, an application programming interface (API) call is made from diagnostic software 112 to driver 114 to initiate an offloading of the pattern matching scanning to GPU 140. That is, software hooks in diagnostic software 112 utilize an API call to driver 114 to request that pattern matching scanning be offloaded to GPU 140. In turn, driver 114 then generates any necessary commands and data pointers to instruct bridge module 120 and GPU 140 to provide access to data blocks 180 to GPU 140 for pattern matching scanning. In the case of a computing system 100 performing two or more different types of pattern matching scanning, driver 114 may also provide instructions to GPU 140 to define the type of pattern matching scanning to be performed.

The results of the pattern matching scanning performed by GPU 140 are reported back to diagnostic software 112 in CPU 110. This may be implemented with different levels of specificity, depending upon bandwidth and processing constraints. For example, the report may be a flag or other bit indicating a match occurred. Alternatively an exact string may be reported or a list of all strings and offsets. While GPU 140 may perform all of the pattern matching scanning, more generally GPU 140 may perform selected portions of the pattern matching scanning. For example, GPU 140 may perform a first pass of pattern matching scanning to identify data blocks 180 having potential problems. In one implementation, the report that is sent back to diagnostic software 112 is used by diagnostic software 112 to select data blocks 180 for additional analysis in a second pass of analysis. The second pass of analysis may, for example, be performed either on GPU 140 or on CPU 110.

GPU 140 may be adapted to receive data in specified data formats. Reformatting of input data may occur in CPU 110. Alternatively, in one embodiment bridge module 120 includes a data reformater 128 to convert input data blocks 180 into a format compatible with GPU 140. In another embodiment, a processing block 142 of GPU 140 is used to perform at least some of the data reformatting GPU 140 utilizes a string database 152 to perform pattern matching scans for a particular diagnostic function. In one embodiment an initialization process is implemented by diagnostic software 112 to load the string database 152 into a memory accessible to CPU 140, such as frame buffer 150 or a portion of main memory 130.

The string database 152 is a dictionary of strings of characters that input data is compared against to identify matches indicative of problems with a data block 180. Pattern matching scanning requires testing input data for the occurrence of a sequence of characters having a specified order. As such, one way of performing a pattern matching scan in GPU 140 is to utilize a state table in which the state is incremented each time that a successive character of an input data string matches a pattern. That is, the state advances with each successive matching character until a terminal state is reached, indicating a pattern match was identified. There may also be an exit state indicating that no pattern match was found. In one embodiment, string database 152 includes finite state machine (FSM) dictionary tables 154 which are designed to execute a FSM implementation of a pattern matching algorithm when GPU 140 executes a pre-selected processing operation. The FSM dictionary tables 154 may be compiled and loaded by diagnostic software 112 into a memory accessible by GPU 140.

String pattern matching scanning is performed utilizing at least one processing block 144 of GPU 140, such as a pixel shader, vertex processor, or video processor. GPUs typically include pipeline stages designed to perform certain types of graphics operations in parallel over a substantial number of parallel processors. For example, many GPUs have hundreds or even thousands of processors in selected pipeline stages, such as a shader stage or a vertex processor stage. It is therefore desirable to perform pattern matching scanning in a way that is compatible with the types of graphics operations that a GPU is designed to process in parallel. This permits GPU 140 to be used to perform pattern matching using parallel processors, improving the speed with which pattern matching scanning can be performed. As a result, GPU 140 can be utilized to perform pattern matching scanning with the processing work of the pattern matching scanning distributed over many different internal processors, resulting in potential speed improvements compared with performing pattern matching scanning in a conventional CPU 100.

An exemplary graphics operation to execute a FSM implementation of a pattern matching scanning algorithm is a dependent texture fetch. Dependent texture operations are well-known graphics operations described in graphics standards such as the OpenGL® 2.0 Specification, the contents of which are hereby incorporated by reference. Pixel texture and dependent texture are commonly used to describe graphics operations in which color fragments are used to generate texture coordinates. The color fragments are replaced with corresponding entries from a texture. These operations are essentially equivalent to an arbitrary function evaluation using a lookup table. Thus, one way to implement a FSM for pattern matching scanning in a GPU is to implement string database 152 as textures selected to execute a FSM for performing pattern matching when a dependent texture operation is performed. In particular, string database 152 may be implemented as FSM dictionary tables 154 stored as a texture such that in response to a dependent texture operation an input character string is compared to entries in the FSM dictionary table 154. In this case, the function evaluation performed by the table lookup to FSM dictionary table 154 is selected to implement a FSM designed to perform a pattern matching scan.

Figure 2:
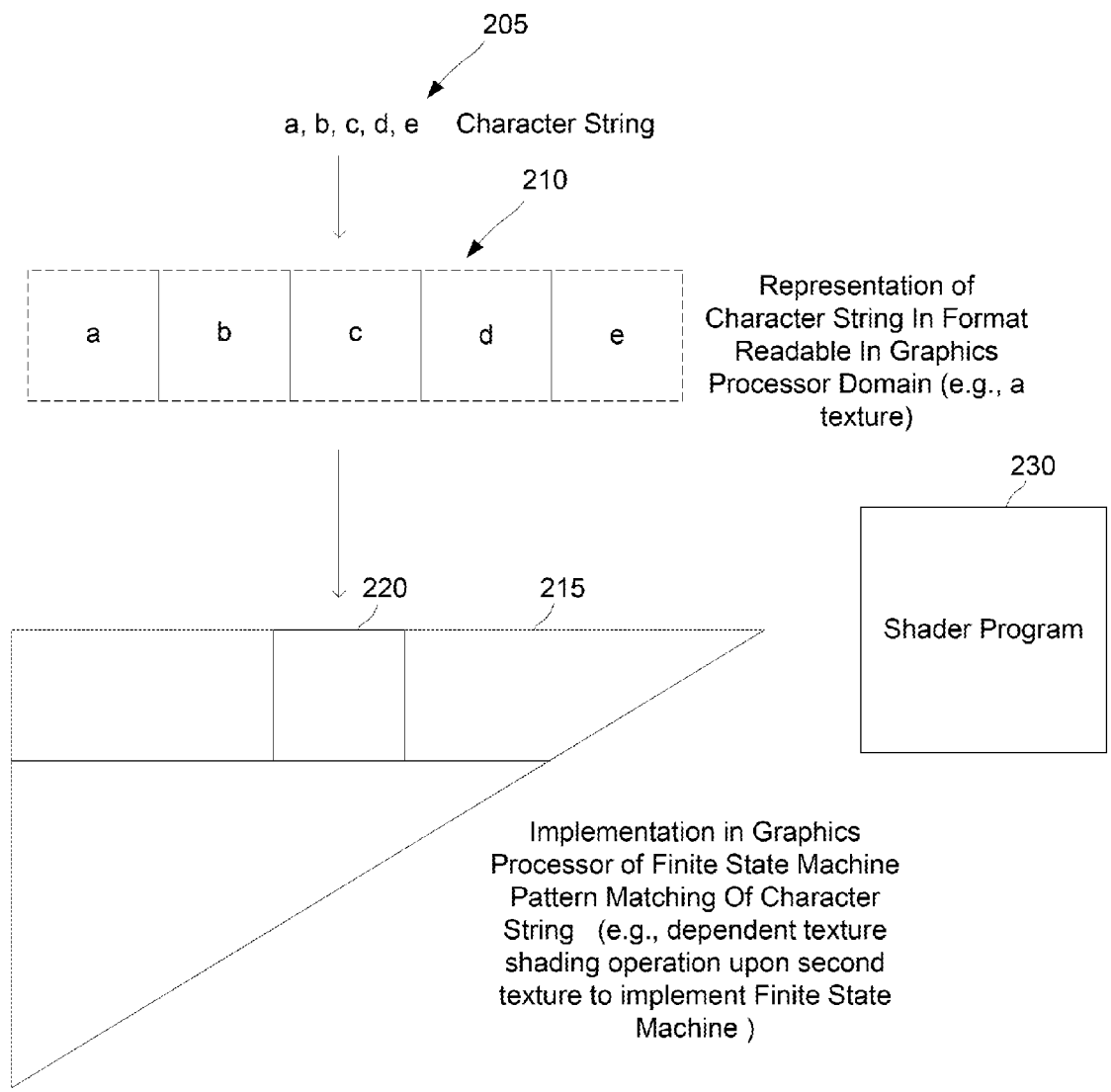
FIG. 2 is a diagram illustrating a method of performing pattern matching scanning utilizing a graphics operation in accordance with one embodiment of the present invention.

FIG. 2 illustrates an exemplary process for performing pattern matching in GPU 140 using dependent texture operations. Driver 114 (not shown in FIG. 2) opens a graphics device channel for performing graphics processing to draw primitives, e.g., triangles. An input data character string 205—such as a character string a, b, c, d, and e—is converted into a input data structure compatible with GPU 140, such as a texture 210 in which each character is represented as an attribute of a pixel, such as a color. In an exemplary application each pixel has four thirty-two bit values. As an illustrative example, texture 210 may be a one or two-dimensional texture with each pixel being a single character (e.g., byte) of the input data. A shader program 230 is implemented to perform a texture dependent fetch to compare texture 210 with a two-dimensional texture corresponding to a FSM dictionary table 154. In one embodiment the output data is a one-dimensional texture surface in which the byte value of each pixel position represents whether a string was detected in the input starting in that position. In one embodiment, a pixel 220 of a bitmap is shaded to indicate that an instance of a pattern match was detected.

Table I illustrates in more detail a portion of an exemplary FSM dictionary table. An input data block 180 is represented as an input data structure corresponding to a first texture, such as a linear texture in which each character (e.g., each ASCII byte value) is assigned to one pixel. The FSM dictionary table corresponds to a second texture which is a two-dimensional texture. An x-dimension of a second texture corresponds to the ASCII byte value of an input character (e.g., a, b, c, or d) defining a pattern match and the y dimension corresponds to the current state of the state machine. In a dependent texture operation the value accessed at a point x, y would be the next state of the state machine. Thus, as a dependent texture fetch operation is performed Table I is traversed in a raster fashion. Thus, for example, in the first state (second row) if characters "ab" are encountered the state moves to state 2.

Table II illustrates another example of an FSM dictionary table. The table structure is arranged as a jump table. The address into the table is formed from {state byte}, where state is a per-thread register that is retained, and byte is the next byte of input. The contents of the texture are used to update state. As one example, consider a state table of 7*256 entries which searches for the strings "foo" and "sam". The initial state is set to 2. States 0 and 1 are sticky. Upon exit, if state==0, there was no match. If state==1, there was a match.

Referring back to FIG. 2 and Tables I and II, in one embodiment shader program 230 starts in an initial state and reads sequential values from a starting point within texture 210. Shader program 230 then uses these values to make a dependent texture fetch to the FSM dictionary table 154 to find the next state. This continues until the state of the FSM dictionary table 154 indicates that the next state is a terminal state. In one embodiment the output data structure is a one-dimensional texture surface in which the byte value of each pixel position represents whether a string was detected beginning at a corresponding character position (e.g., byte position in an implementation in which a character corresponds to a byte) in texture 210. For example, in one embodiment the output of the shader program is a bitmap 1 wide by N long, where N is the number of bytes in the payload (e.g., in an embodiment where a character corresponds to a byte, the bitmap corresponds to a length of N characters). If the FSM arrives at a terminal case indicating that a match was found, a pixel is written to indicate that a match was found. In one embodiment, the pixel is written in a location indicative of a corresponding byte location in the input data character string where a pattern match begins (e.g., the pixel is written red in the location of the bitmap corresponding to a string pattern match starting at that byte location). If no match is found, the pixel is written with a different format (e.g., the pixel is written white). Thus, upon completion of shader program 230 the pixels are written such that instances of pattern matches can be detected by detecting pixels with the specified shading characteristics (e.g., red pixels in this example).

TABLE I

Portion of exemplary FSM dictionary table illustrating state transitions.

| state | a | b | c | d |
|---|---|---|---|---|
| 0 | 0 | 0 | 0 | 0 |
| 1 | 0 | 2 (move to state | | |

TABLE I-continued

Portion of exemplary FSM dictionary table illustrating state transitions.

| state | a | b | c | d |
|---|---|---|---|---|
| | | 2 if string "ab" is matched) | | |
| 2 | 0 | 0 | | 3 (move to state 3 since string "abc" is matched) |
| 3 | | | | |

TABLE II

Second example of FSM dictionary table.

| State | byte | state_next |
|---|---|---|
| 0 (no match) | ... | 0 |
| 1 (match) | ... | 1 |
| 2 (start) | 0 | 0 |
| | ... | 0 |
| | 'f' | 3 |
| | ... | 0 |
| | 's' | 4 |
| | ... | 0 |
| 3 | ... | 0 |
| | 'o' | 4 |
| | ... | 0 |
| 4 | ... | 0 |
| | 'o' | 1 |
| | ... | 0 |
| 5 | ... | 0 |
| | 'a' | 6 |
| | ... | 0 |
| 6 | ... | 0 |
| | 'm' | 1 |
| | ... | 0 |

In one embodiment, pointers to data structures are passed on to a shader program 230 to perform the pattern matching scanning. One of the pointers is to the data to be scanned. The input data is formatted as a one-dimensional or two-dimensional texture, with each pixel being a single character of the input data. The other pointer is to a state table corresponding to an output texture. Depending upon the implementation, other information may also be passed on the shader program 230 to implement the desired pattern matching scans and output data in a desired format.

Figure 3:
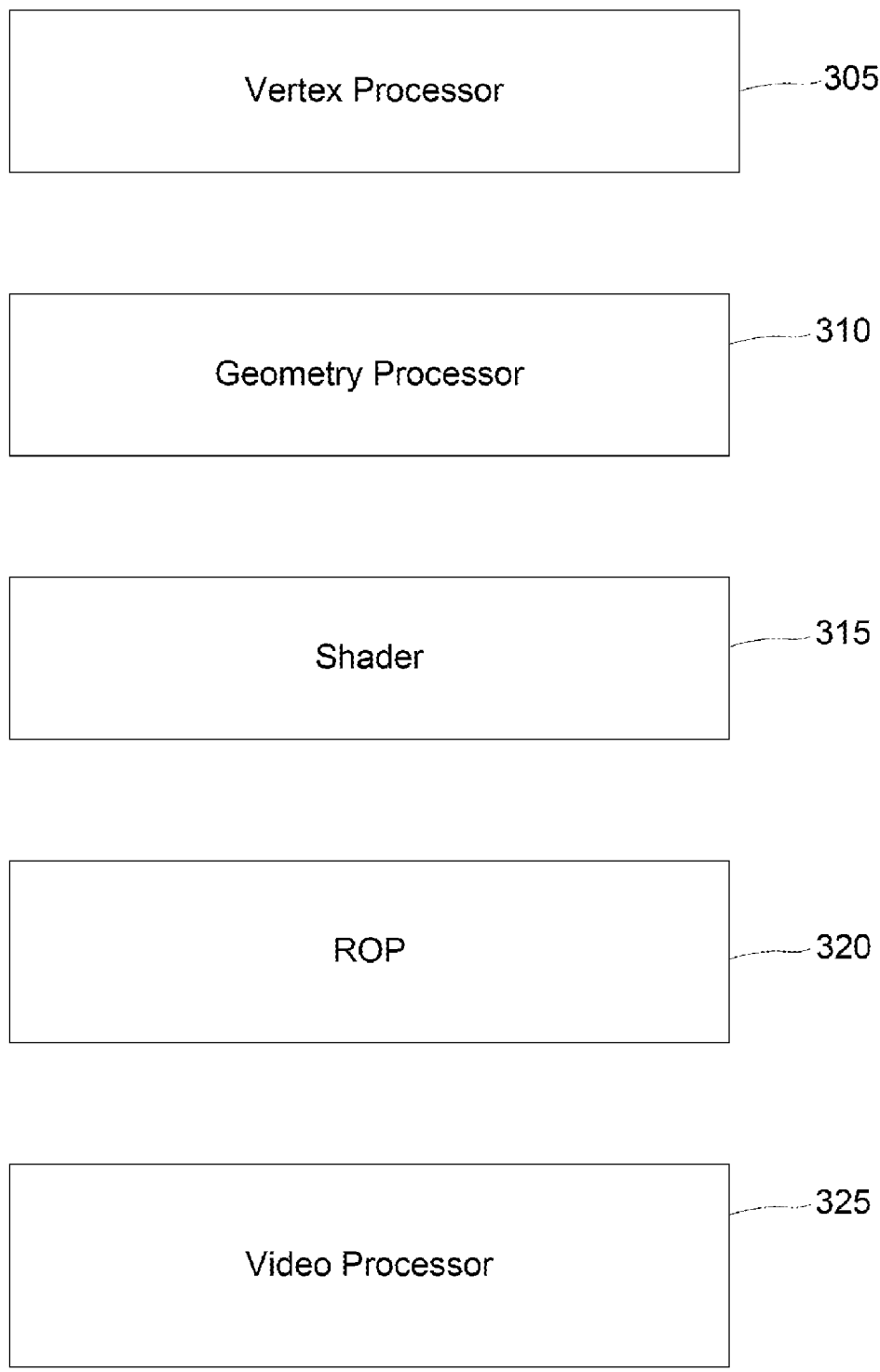
FIG. 3 illustrates a graphics processing unit in accordance with one embodiment of the present invention.
Figure 4:
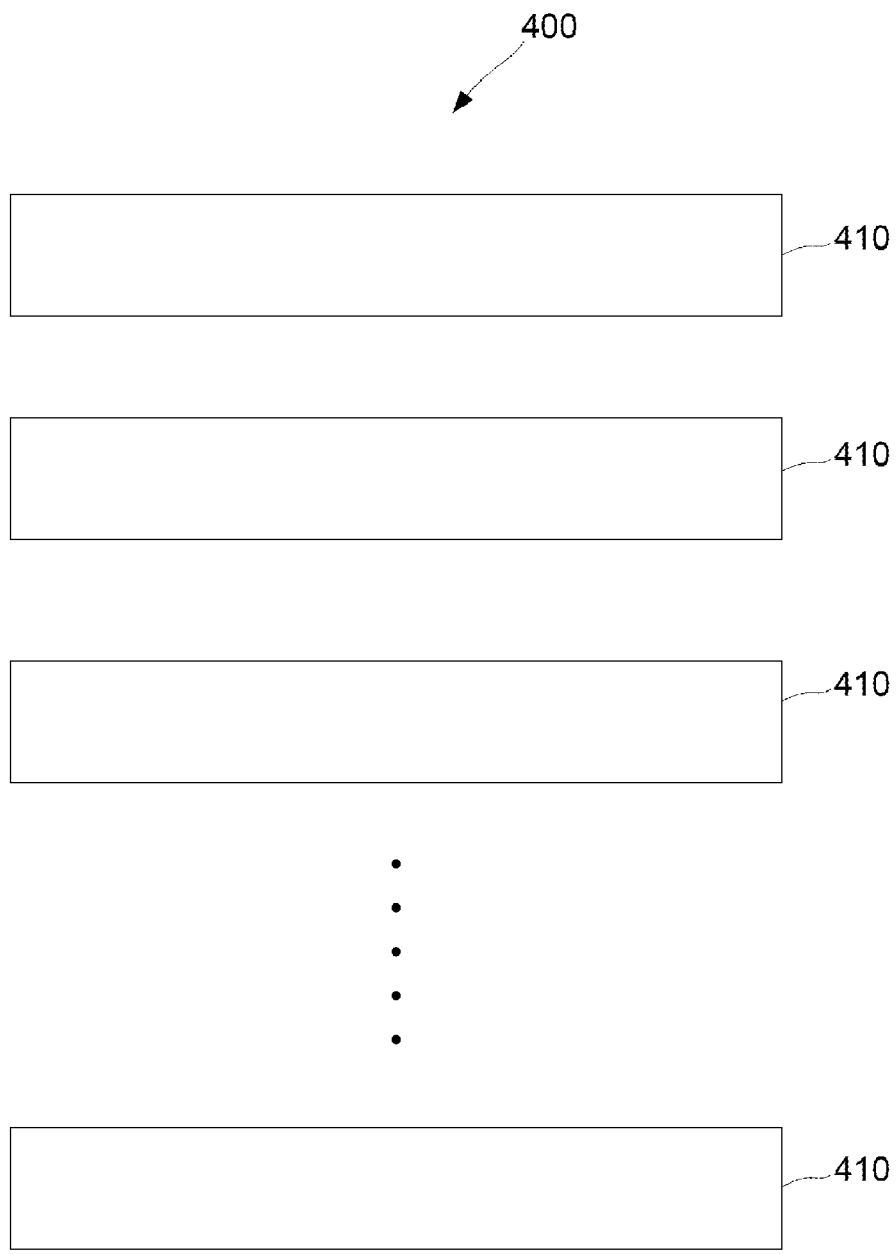
FIG. 4 illustrates a stage of a graphics processing unit having an array of parallel processors in accordance with one embodiment of the present invention.

One aspect of the present invention is that it can exploit the parallelism of a GPU 140 having one or more stages with parallel processing units. FIG. 3 illustrates an exemplary GPU 140 having a pipelined architecture which includes a vertex processor stage 305, geometry processor stage 310, shader stage 315, raster operations (ROP) 320, and video processor 325. As illustrated in FIG. 4, an individual stage 400, such as shader stage 315 may, in turn, have a multi-threaded parallel processor architecture in which stage 400 has a number of different processors 400 that are assigned work from a thread pool. This permits a program executed on stage 400 having parallel processors 410 to generate execution threads which are processed in parallel.

GPU 140 is preferably optimized for a particular implementation to efficiently read FSM dictionary tables 154 of string database 152, read input data blocks, record matches, report results, and reformat data. One optimization is to encode a FSM dictionary table 154 for a data string so that a single read of the FSM dictionary table 154 returns not only the next FSM state but a compressed list of one or more of next most-likely states along with corresponding input values. The number of data reads can be reduced by selecting an efficient input texture format based upon the different types of data stored in a pixel. For example, in an R, G, B, alpha format, an input texture can be optimized by repeating values of a character string in a staggered manner in the red, green, blue and alpha fields of a pixel such that the data string "abcdefg" is encoded in a pixel as "abed", "bcde", "cdef" and "defg." In this example, a single read permits the input value and the next three values to be obtained from a single read. In one embodiment the shader program discards pixels where no strings were detected to reduce the amount of data that must be recorded. In this embodiment, the number of strings matches with the input data can then be obtained by counting the number of pixels written to the output structure. One optimization for handling larger input data blocks is to format large data blocks as two-dimensional textures. Two-dimensional textures complicate comparisons at the edges of textures. However, these issues can be addressed by padding the two-dimensional structures with repeated sections of input data or by adding a wrapping mode in the graphics hardware. Another optimization is to offload reformatting of input data to hardware such that the CPU does not have to reformat input data into a texture format.

Figure 5:
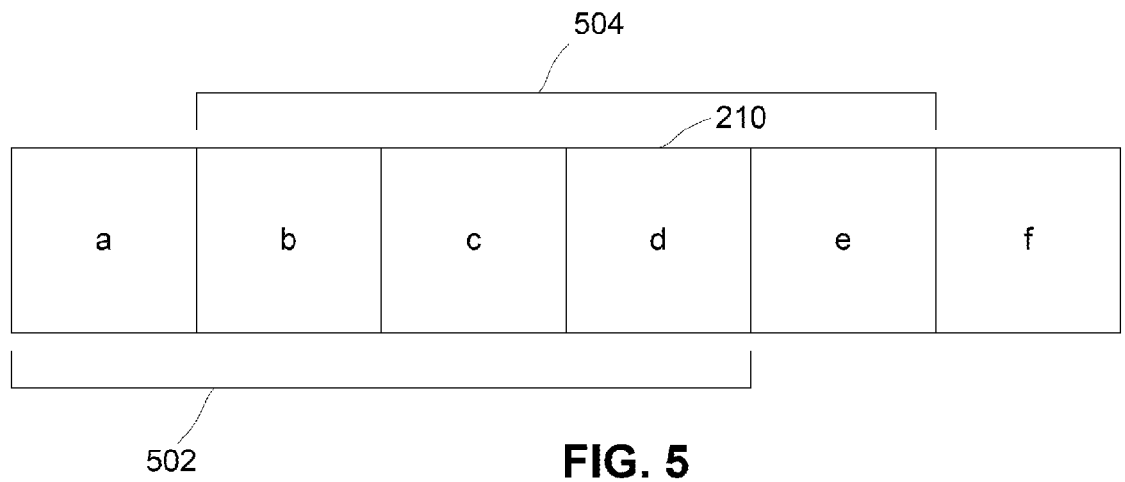
FIGS. 5 and 6 illustrate a method of utilizing parallel processing threads to scan different windows of a character string in accordance with one embodiment of the present invention.
Figure 6:
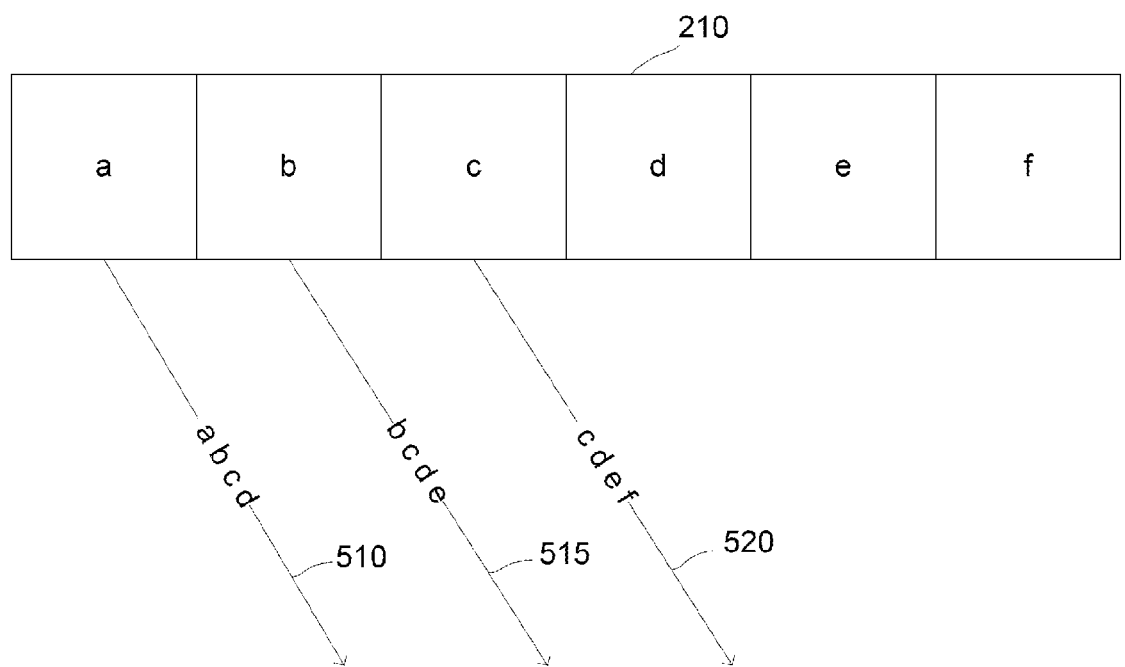

FIGS. 5 and 6 are diagrams illustrating parallel pattern matching scanning. As illustrated in FIG. 5, it is desirable to examine different windows 502 and 504 of input texture 210 corresponding to different byte offsets. That is, each window has a different byte offset. As illustrated in FIG. 6, different threads 510, 515, and 520 of GPU 140 are assigned to process the different windows in parallel. For example, a first thread 510 may check for a pattern match to a window of the input data string corresponding to "abed," a second thread 515 may check for a pattern match to a window corresponding to "bcde," and a third thread 529 may check for a pattern match to a window corresponding to "cdef."

In one implementation of parallel pattern matching scanning, a shader program is run for every byte offset in the input data to perform pattern matching scanning in a parallel fashion. For example, for a 2 kB input string, the shader program may be run 2048 times in parallel with the value of the coordinates ranging from (0,0) to (0,2047). In one embodiment, if a string is found at a position coordinate x, then the corresponding pixel in the output texture is set to red and the occlusion counter will increment. Below is exemplary pseudocode describing operations performed by a shader program for checking for strings:

```
//float4 scan(float2   coords : DOMAIN     // parameter containing
the starting offset
    Stream         statetable,             // parameter pointing to
the output texture (not used)
    Stream         transitiontable,        // parameter pointing to
the table encoding the list of strings
    Stream         packetdata,             // parameter pointing to
the input data (e.g. network buffers)
    uniform float4 windowDims) : RANGE     // (not used)
{
// Initialize the "state" of the FSM to 1.
    float state = 1;
// This color of the output pixel will indicate whether a string was detected.
// In this example, the output color is initialized to "red", indicating a string
    has been found at this starting offset.
    float4 stateColor = float4(1.0,0,0,0);
    float packetbyte:
    int i;
// We walk through the FSM for 16 steps, which is the length of the longest
string in the string table.
// This can easily be adjusted for tables with longer strings.
    for(i=0; i<16; i++) {
```

-continued

```
    packetbyte = packetdata.value(float2(coords.x+i,coords.y));
    state = transitiontable.value(float2(packetbyte, state));
    }
// Now see what state the FSM is in. State == 0 means a string was detected.
    if (state > 0) {
        // If no string was detected, discard the packet.
        // This is an optimization that allows us to use occlusion queries to
efficiently determine if pixels were set
            discard;
        }
// Set the pixel to "red". // ignored if discard happened above.
    return stateColor;
    }
```

As previously described, a benefit of the present invention is that scanning is offloaded to GPU 140. In many computing systems, GPUs are bundled with a CPU. As a result, in many applications an end-user gets the benefit of a reduced burden on their CPU and potentially faster scanning without increasing the hardware cost of computing system 100. Additionally, a GPU is also capable of performing pattern scanning processing using parallel processing, potentially increasing the rate at which pattern matching scanning is performed in a computing system.

Figure 7:
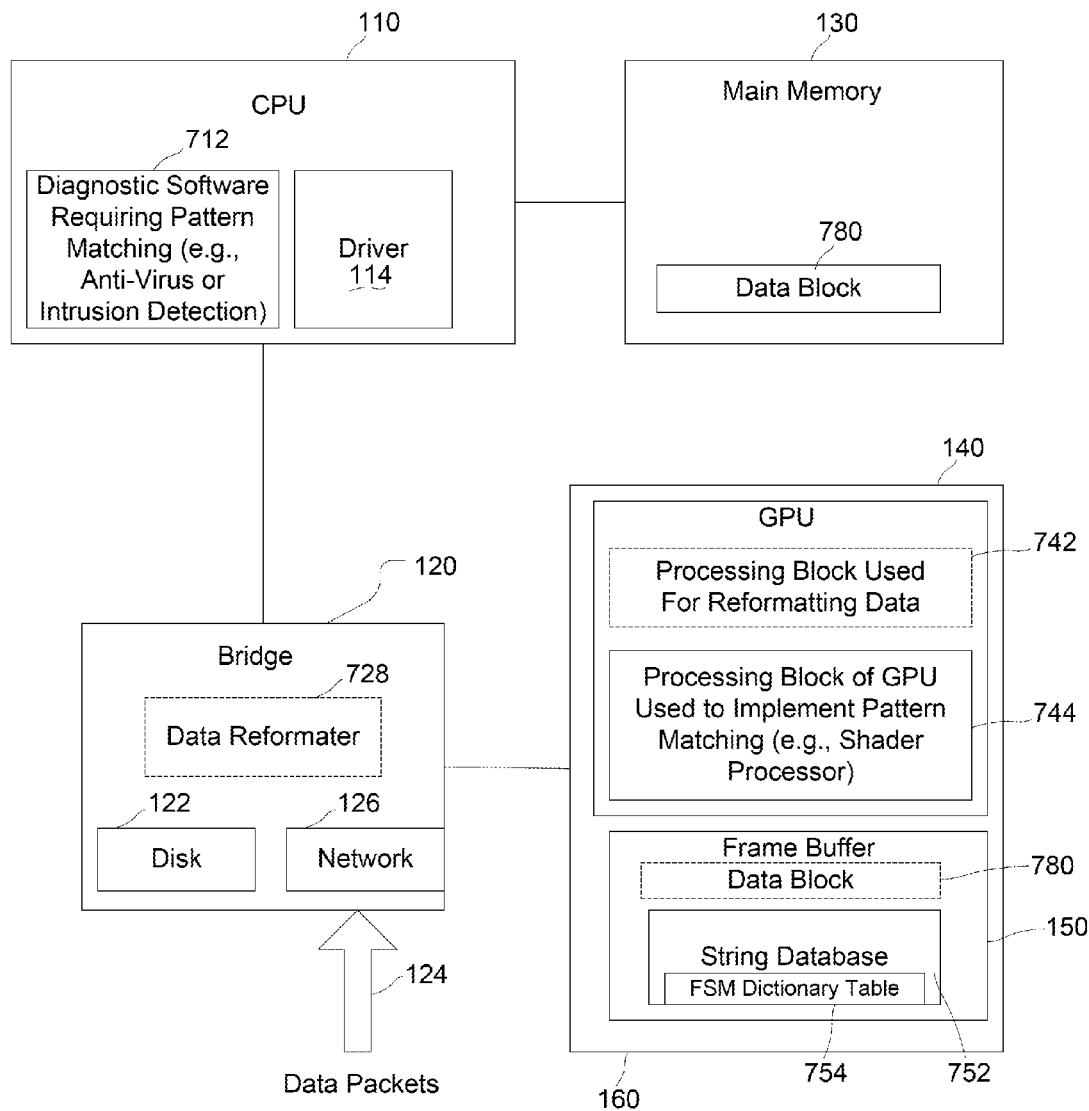
FIG. 7 illustrates an exemplary system for performing packet classification in accordance with one embodiment of the present invention.
Figure 8:
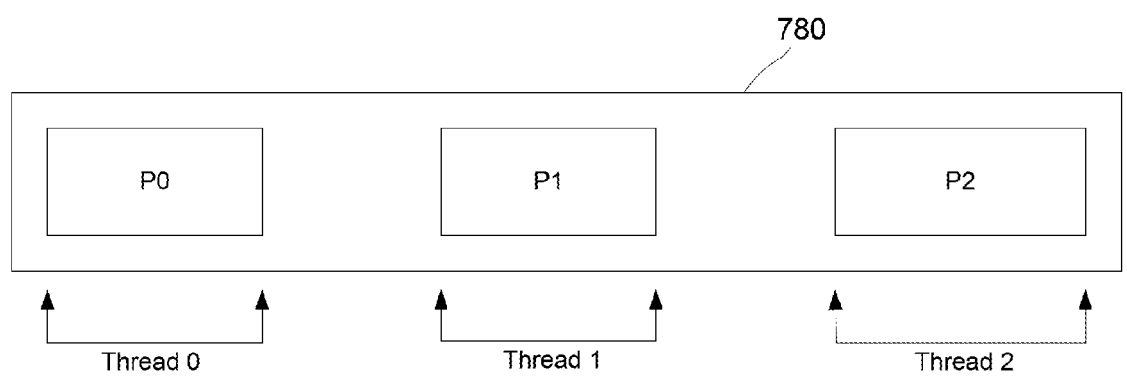
FIG. 8 illustrates padding of input data from data packets in accordance with one embodiment of the present invention.

Referring to FIG. 7, one embodiment of the present invention is for utilizing a GPU to perform packet classification for a computing system, thus offloading packet classification from a CPU to a GPU. The elements of FIG. 7 are similar to those of FIG. 1, except for minor modifications for the data formatting and pattern matching to perform packet classification as described below in more detail. The source of data for a data block 780 comes from data packets 124, such as those received by a network interface 126. FIG. 8 shows irregularly-sized packets getting aligned to regular boundaries in memory. As illustrated in FIG. 8, in one implementation input data from data packets, such as input data from three packets P0, P1, and P2, are padded to regular boundaries and formatted into a data block 780. The padding may be implemented to, for example, create a dead space between data from each data packet such that the data from the packets is aligned to power of two boundaries. The reformatting of the input data can be performed by CPU 110, data packet reformater 728, or processing block 742.

Note that the input data may comprise a selected subset of data from each packet, such as header data and/or a selected portion of payload data. For packet classification, string database 752 is a dictionary of characters that input data from data packets are compared against to identify matches to classification rules. String database 752 has FSM dictionary tables 754 designed to implement a pattern matching algorithm for packet classification when a GPU 140 executes a pre-selected processing operation. A processing block 744 of the GPU is used to implement pattern matching for packet classification. For example, shader program 230 may perform a texture dependent fetch to compare a texture generated from a data block 780 extracted from input data packets with a texture corresponding to a FSM dictionary table 154. Referring again to FIG. 8, processing threads are launched at packet boundaries of the input data. As one example, one packet per 4 k page or stride factor may be launched. The FSM then looks for patterns in bytes based on classification rules.

Packet classification can be efficiently performed in a GPU, due in part to the processing capabilities of highly parallel GPUs and the aspects of packet classification in typical network environments. One aspect of typical network environments is that packet classification rules are typically only occasionally updated. That is, the classification rules are typically static, at least for intervals of time between updates and/or reboots. In one embodiment, a set of reference data contains classification rules that should be processed (e.g., as FSM dictionary tables). In a typical network application, this reference data for packet classification is likely to be mostly static (varying only when the rules are updated, typically once per day or upon system reboot). The reference data may also be accessed frequently during scanning, and benefits from being placed in a frame buffer memory 150 of a graphics card 160.

Another aspect of packet classification that snakes its suitable for offloading to a graphics processing unit is that in a typical packet classification environment packets to be scanned are accessed once and not modified. Graphics cards are typically optimized for reading data such as this.

Packet classification is also suitable for offloading to a GPU because packet classification can be organized to be a short answer identifying to which classification the packets belong to. Packet classification in which a short answer is generated is consistent with offloading to a GPU, since GPUs are sometimes a bottleneck if large amounts of data need to be read back from the GPU to the CPU after processing.

Additionally, the highly pipelined and parallel nature of GPUs is consistent with the need to process a continuous stream of packets to perform packet classification. The pipelined and parallel nature of graphics processors is of benefit to efficiently perform packet classification.

An exemplary embodiment of a packet classification technique will now be described in more detail. In one embodiment a dictionary of classification rules to apply is pre-processed as a finite state machine (FSM) representation, the FSM dictionary table 754. The FSM dictionary table may be encoded into a two-dimensional texture optimized for GPU access. For example, the x dimension of the texture would correspond to the ASCII byte value of the input character, and the y dimension would correspond to the current state of the state machine. The value accessed at position (x,y) would be the next state of the state machine.

The input data is formed from multiple input packets, padded to a regular boundary. The input data may be formed from a selected subset of packet data, such as selected header subsets from multiple input packets. The input data may be formatted into a one-dimensional texture, with each pixel being a single character of the input data. The output data is a one-dimensional texture surface, in which the byte value of each pixel position represents the classification of a corresponding packet in the input.

The shader program calculates the value for each pixel in the output structure by accessing the input texture at a corresponding offset. The shader program FSM representation starts in the initial state, and reads sequential values from the input structure's starting point. It then uses these values to make a dependent texture fetch to the FSM dictionary table 754 to find the next state. This continues until the FSM indicates the next state is a terminal state. If the FSM arrives at a terminal case indicating a classification has been found, the pixel is written with a color value corresponding to the classification. If no match was found, the pixel is written as white.

Various optimizations may be supported for packet classification. For example, since the dependent texture fetches during the FSM next-state calculation are a performance bottleneck, the FSM dictionary table 754 can be encoded so that a single read returns not only the next FSM state, but a compressed list of the next several most-likely states (and corresponding input values). As another example, since reading the input structure is also a performance limiter, the input texture can be optimized by repeating values in a staggered manner into the {red, green, blue, alpha} values of a pixel. For instance, encoding the string "abcdefg" as {"abcd", "bcde", "cdef", "defg"} would allow the input value and the next three values to be obtained from a single read. Larger input data blocks can be supported by formatting them into two-dimensional, rather than one-dimensional structures. This complicates comparisons at the edges of the textures. This can be handled by padding the structures with repeated sections of the input data, or new wrapping modes in the graphics hardware. Optimizations that relate to re-formatting the input data can be offloaded to hardware so that they do not burden the CPU. In addition, system optimizations can be done to enable a network controller to place input data, or a re-formatted copy of input data, into specific regions of memory such as the graphics frame buffer.

Packet classification has many applications. Packet classification requires looking inside of data packets at a selection of bytes to determine how to classify the packets. Data packets typically are arranged to have headers and payload data sections, depending on the implementation details of the data packet. The first 100 to 200 bytes of the packet will generally provide information for packet classification, although more generally any subset of fields of a packet (e.g., headers fields and/or other packets portions) may be analyzed to classify the packets. As one example, packet classification is useful in layer 2 applications to classify packets based on a MAC address or location for virtual server classification. As another example, for layer 3 applications, packet classification may look into IP/TPC addresses to sort packets for interfaces. For example, TCP network packets, would rely on IEEE and IETF specifications of network packet formats and protocols. As one example, TPC/UPC headers could be classified and a bit code, such as a 1 or 0, sent back as the classification result. As yet another application of packet classification, packet classification may be performed for an application layer or higher layer. For example, an operating system or other software 712 could utilize packet classification to facilitate processing of data packets. In a graphics system, packet classification could also be used to sort data packets into traffic classes that distinguish two or more different types of traffic, such as distinguishing game traffic from other traffic.

In one implementation, every packet is classified by the GPU. However, more generally, a subset of each packet may be copied and provided to the GPU for classification. For example, the packet headers may be copied and the copies split off and placed in memory for classification by the GPU. In this example, the GPU can then send classification results to the CPU. As another example, a selection subset of bytes (e.g., the first 256 B of each data packet) are copied into memory as header data. The GPU then classifies the header data.

In one implementation, packet classification is performed by the GPU on the behalf of the CPU and/or a network device. More generally, however, the GPU may also perform packet classification for local use in the GPU.

It will be understood that the shading operation may be implemented using different techniques. For example, the present invention may be implemented using a graphics system employing a Direct X 10 API and an Nvidia GeForce 8800 series architecture of graphics processors. Nvidia GeForce 8800 series graphics processing units support Shader Model 4.0, which includes innovations such as a geometry shader and a unified shading architecture. The GeForce 8800 Architecture is described in several publications of the Nvidia Corporation, such as "Technical Brief Nvidia GeForce 8800 GPU Architecture Overview," published November, 2006 and "Technical Brief Microsoft DirectX 10: The Next Generation Graphics API," also published November 2006, the contents of each of which are hereby incorporated by reference.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus for use in a computing system having a central processing unit (CPU), comprising:
   a graphics processing unit (GPU) for processing graphics data coupled to said CPU;
   said GPU configured to have a mode of operation in which said GPU classifies data packets on the behalf of said computing system,
   wherein input data from input packets are formatted into a texture, with each pixel of said texture corresponding to a respective character of said input data, wherein a shading operation is performed on each pixel to perform packet classification.

2. The apparatus of claim 1, further comprising a memory accessible to said GPU that stores a finite state machine implementation of a packet classification algorithm, and said shading operation implements said finite state machine implementation.

3. The apparatus of claim 1, wherein said input data comprises entire packets.

4. The apparatus of claim 1, wherein said input data comprises packet headers.

5. The apparatus of claim 1, wherein said input data comprises selected subsets of said input packets.

6. The apparatus of claim 1, wherein said input data is padded to regular boundaries, and said shading operation is a dependent texture operation to implement a finite state machine implementation of a pattern matching algorithm.

7. The apparatus of claim 1, wherein said input data is formatted into an one-dimensional texture.

8. The apparatus of claim 1, wherein said input data is formatted into a two-dimensional texture.

9. The apparatus of claim 1, wherein an output generated by said shading operation comprises a texture surface in which a byte value associated with a pixel location represents a packet classification.

10. A computing system, comprising:
a central processing unit having a memory and associated software requiring packet classification; and
a graphics processing unit communicatively coupled to said central processing unit for performing graphics processing;
said graphics processing unit adapted to have a mode of operation in which said graphics processing unit performs packet classification in which data is compared to a string database,
wherein input data packets to be classified are represented as a first texture, classification rules are represented as a second texture, and a shading program is performed to classify said input data packets based on said first texture and said second texture.

11. The computing system of claim 10, wherein said classification rules are stored in the form of a finite state machine dictionary table operative to execute a packet classification algorithm.

12. The computing system of claim 10, wherein said shading program performs a dependent texture operation to execute a finite state machine implementation of packet classification.

13. A method of performing packet classification in a computing system having a central processing unit and a graphics processing unit, comprising:
formatting input data from data packets into pixels, wherein said input data is padded to regular boundaries; and
performing a shading operation in a graphics processing unit to implement packet classification, wherein said shading operation is a dependent texture operation to implement a finite state machine implementation of a packet classification rule.

14. The method of claim 13, wherein said data packets to be classified are represented as a first texture, said packet classification rule is represented as a second texture, and said shading operation is performed to classify said data packets.

15. The method of claim 14, further comprising storing said packet classification rule in the form of a finite state machine dictionary table operative to execute a packet classification algorithm.

* * * * *